United States Patent [19]

Miwa

[11] Patent Number: 4,625,097

[45] Date of Patent: Nov. 25, 1986

[54] RICE COOKER

[75] Inventor: Yoshiyuki Miwa, Aichi, Japan

[73] Assignee: Kabushiki Kaisha Toshiba, Kawasaki, Japan

[21] Appl. No.: 674,316

[22] Filed: Nov. 23, 1984

[30] Foreign Application Priority Data

Nov. 25, 1983 [JP] Japan .......................... 58-182353[U]
Dec. 6, 1983 [JP] Japan .......................... 58-188287[U]

[51] Int. Cl.⁴ ..................................... F27D 11/02
[52] U.S. Cl. ..................................... 219/441; 219/438
[58] Field of Search ............. 219/431, 435, 438, 439, 219/440, 441, 442; 126/374, 388

[56] References Cited

U.S. PATENT DOCUMENTS

| 2,987,607 | 6/1961 | Panlin | 219/442 |
| 3,828,164 | 8/1974 | Fischer et al. | 219/431 |
| 4,241,288 | 12/1980 | Aoshima et al. | 219/441 |
| 4,257,394 | 3/1981 | Zabel | 126/374 |
| 4,303,816 | 12/1981 | Goessler et al. | 219/10.49 R |
| 4,313,051 | 1/1982 | Aoshima | 219/441 |
| 4,315,139 | 2/1982 | Oshini et al. | 219/441 |

FOREIGN PATENT DOCUMENTS

| 248884 | 3/1926 | United Kingdom . |
| 843466 | 8/1960 | United Kingdom . |
| 1018818 | 2/1966 | United Kingdom . |
| 1449645 | 9/1976 | United Kingdom . |

Primary Examiner—Clarence L. Albritton
Assistant Examiner—Teresa J. Walberg
Attorney, Agent, or Firm—Cushman, Darby & Cushman

[57] ABSTRACT

A rice cooker has a main body storing a pot therein. A lid is pivotally mounted on the main body by a hinge. An operation panel is provided on the lid to face upward. At the operation panel are provided operation switches for operating the rice cooker and light-emitting elements for indicating an operation process of the rice cooker.

10 Claims, 6 Drawing Figures

RICE COOKER

BACKGROUND OF THE INVENTION

The present invention relates to a rice cooker.

Rice cookers generally comprise a main body housing a pot therein and a lid which is mounted on the main body so as to be freely opened and closed. In conventional rice cookers, an operation panel is mounted on a lower portion of an outer surface of the main body and projects from the outer surface. In this operation panel, an operation unit for performing a rice cooking operation is provided so as to be externally operable, and light-emitting elements such as indicator lamps or light-emitting diodes are disposed therein. When the operation unit is operated, the rice cooking operation can be performed. In addition, the rice cooking process can be recognized by visually checking light from the light-emitting elements, in accordance with this operation, through windows formed in the operation panel.

However, in the conventional rice cooker, since the operation panel projects from the outer surface of the main body, a large space is required for the rice cooker and this also results in poor appearance.

The rice cooker is usually located at a relatively low position such as a table, a sink or the like with the intention of serving rice from the pot after the rice cooking operation is completed. For this reason, the eye level of a user is usually higher than the main body. In the coventional rice cooker, the operation panel is positioned at the lower portion of the outer surface of the main body, and a user views the operation panel at an excessively oblique angle while he or she stands. If the user does not stoop, it is difficult not only to see the operation panel, but also to operate it. Furthermore, in this case, the user can only operate the operation panel from a position substantially in front of it, and he or she can see the indications only from this position.

SUMMARY OF THE INVENTION

The present invention has been made in consideration of this situation and has as its object to provide a rice cooker which requires a small space, and allows easy visual recognition and operation of an overall operation panel.

According to an aspect of the present invention, there is provided a rice cooker comprising a main body having a pot therein, a lid mounted on the main body to be freely opened and closed, and an operation panel facing upward on the lid and having an operation unit for performing the rice cooking operation.

According to the rice cooker having the above arrangement, there is no projection of an operation panel on an outer surface of the main body such as in a conventional one, so the space required is minimized. In addition to this, since the operation panel is provided on the lid, overall visual recognition and operability of the operation panel can be improved.

BRIEF DESCRIPTION OF THE DRAWINGS

FIGS. 1 to 3 show a rice cooker according to a first embodiment of the present invention, in which:
FIG. 1 is a perspective view of the rice cooker,
FIG. 2 is a sectional view of a lid,
and
FIG. 3 is an enlarged plan view of an operation panel;
FIGS. 4 and 5 show a rice cooker according to a second embodiment of the present invention, in which:
FIG. 4 is a perspective view of the rice cooker,
and
FIG. 5 is a cross-sectional view of the rice cooker.

DETAILED DESCRIPTION OF THE PREFERRED EMBODIMENTS

An embodiment of the present invention will be described with reference to the accompanying drawings.

Figure 1:
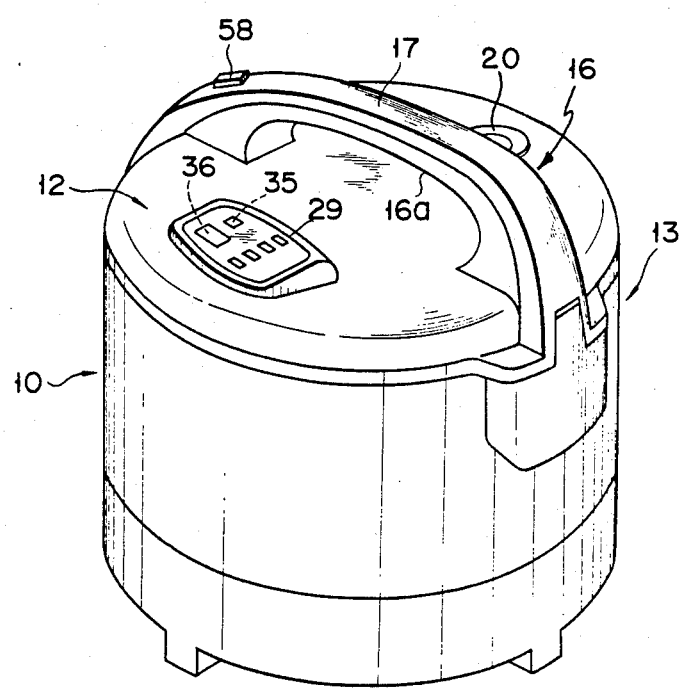
Figure 2:
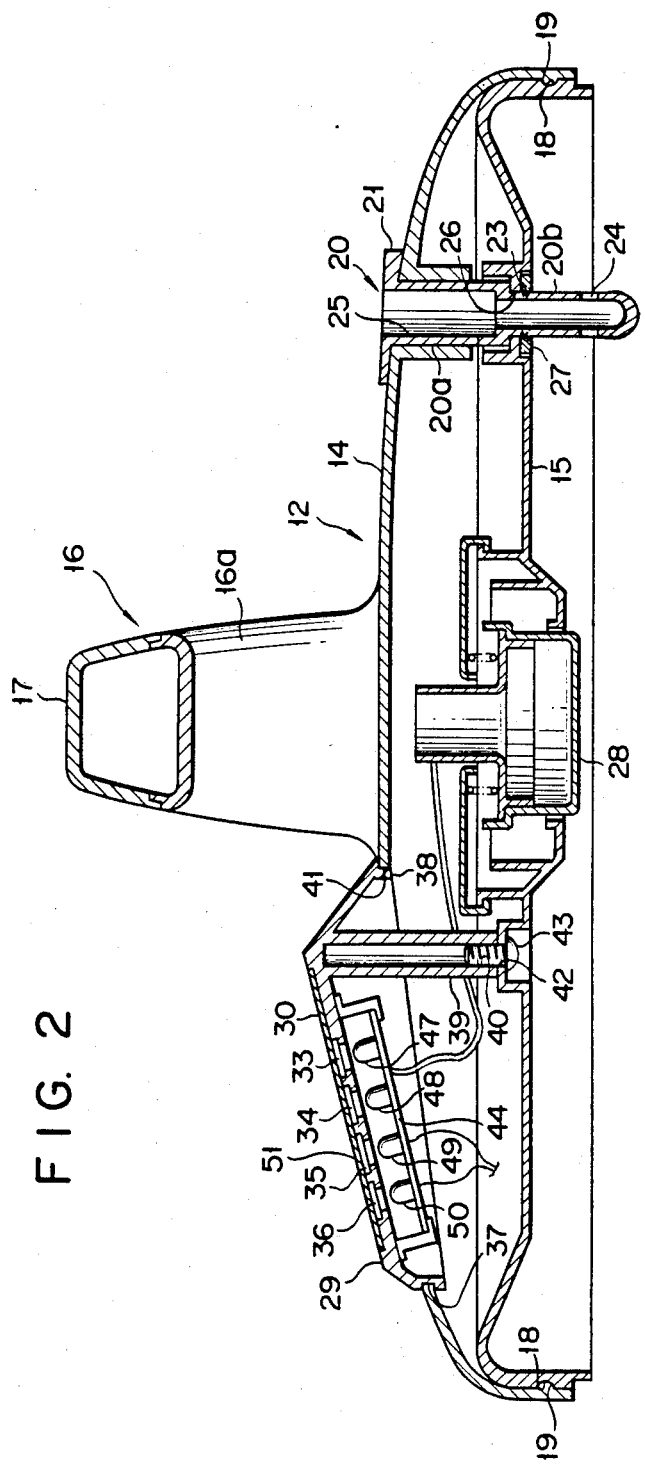
Figure 3:
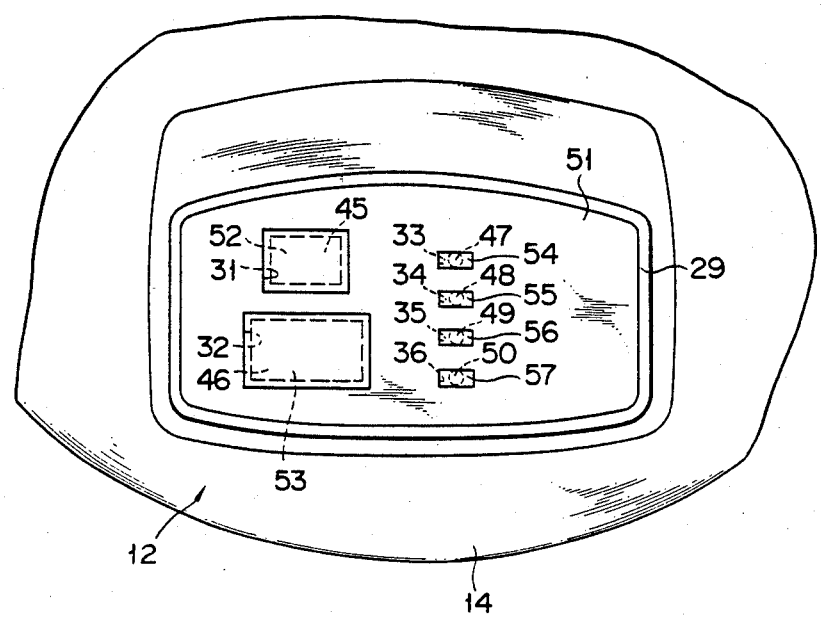

FIGS. 1 to 3 respectively show a rice cooker according to a first embodiment of the present invention.

As shown in FIG. 1, the rice cooker comprises a cylindrical main body 10 with a bottom and a lid 12, which is mounted on the main body through a hinge mechanism 13 so as to open and close an upper opening of the main body. In the main body 10, a pot (not shown) is placed.

As shown in FIGS. 1 and 2, the lid 12 includes an outer lid plate 14 and an inner lid plate 15. A grip portion 16, which extends along a radial direction of the outer lid plate 14, is provided on the upper surface of the outer lid plate 14. The grip portion 16 consists of a base 16a, formed integrally with the outer lid plate 14, and a cover 17, which is attached to the base 16a to cover an upper portion thereof. A plurality of engaging projections 18 are formed on an inner peripheral portion of the outer lid plate 14, and a plurality of engaging recesses 19 are formed in an outer peripheral portion of the inner lid plate 15 so as to correspond to the projections 18. The projections 18 are kept in engagement with the recesses 19 due to an elasticity of the outer and inner lid plates 14 and 15.

A cylinder 20 for releasing steam is provided in the lid 12. The cylinder 20 is formed in a stepped cylindrical shape having a large-diameter portion 20a and a small-diameter portion 20b at its upper and lower sides. A flange 21 is formed at the upper end of the cylinder 20. The small-diameter portion 20b is provided with a threaded portion 23 and steam release holes 24 which are spaced apart along the vertical direction. The cylinder 20 is inserted in a sleeve 25 which is formed at one side in the inner surface of the outer lid plate 14 so as to project downward and in a sleeve 26 which is formed in the inner surface of the inner lid plate 15 so as to oppose the sleeve 25 and project upward. A nut 27 is screwed to the threaded portion 23 of the cylinder 20 from the lower side of the inner lid plate 15 in a state that the flange 21 is brought into contact with the upper surface of the outer lid plate 14, and the nut 27 is then pressed against the inner lid plate 15, thereby fixing the cylinder 20 to the lid 12. By the above arrangement of the cylinder 20, the outer and inner lid plates 14 and 15 are fixed at one side of each thereof. An engaging projection (not shown) for engaging an inner cover (not shown) is provided on the inner surface of the inner lid plate 15, and the inner cover is held below the inner lid plate while it is engaged with the small-diameter portion 20b of the cylinder 20. A cover heater 28 for heating the inner cover is mounted at a central portion of the inner lid plate 15.

Furthermore, an operation panel 29 is mounted on the lid 12. The operation panel 29 will be described in more detail below.

The operation panel 29 is formed of, for example, an ABS resin in a substantially rectangular shape. A recess 30 for a nameplate is formed on the upper surface of the operation panel 29 so as to be inclined toward a side of the main body 10. As shown in FIG. 3, two operation openings 31 and 32 and four indicator openings 33 to 36 are formed in the recess 30. A U-shaped engaging groove 37 is formed in one side edge portion (left side edge portion in FIG. 2) of the operation panel 29. Also, an engaging ridge 38 is formed on the remaining side edge portions of the operation panel 29 (except for the portion having the groove 37) so as to be positioned slightly inside the peripheral portion. Furthermore, a cylindrical boss 39 projects from the lower surface of the operation panel 29 so as to be integral therewith. The boss 39 has a female-threaded portion 40. The operation panel 29 having such an arrangement is fitted in an opening 41 formed at a position opposite to the cylinder 20 with respect to the handle 16 in the outer lid plate 14. The engaging groove 37 is engaged with a side edge of the opening 41 and the ridge 38 is fitted in the other side edge thereof, so that the peripheral portion of the operation panel 29 is engaged with the upper surface of the outer lid plate 14. In this state, a distal end of the boss 39 is urged against a screw hole 42 which projects from the inner lid plate 15. The boss 39 is fixed to the inner lid plate 14 by a screw 43, which is screwed in the female-threaded portion 40 through the screw hole 42. Therefore, the outer and inner lid plates 14 and 15 are urged against each other by the operation panel 29.

A printed circuit board 44 is arranged between the operation panel 29 and the inner lid plate 15 to oppose the operation panel 29. On the upper surface of the printed circuit board 44, operation units 45 and 46 (FIG. 3) of, for example, two operation switches (neither are shown) for performing the rice cooking operation and four light-emitting elements 47 to 50 for indicating the rice cooking process are arranged to correspond to the operation and indicator openings 31 to 36 of the operation panel 29. Lead wires (not shown) extending from the operation switches and the light-emitting elements 47 to 50 on the printed circuit board 44 are coupled to lead wires (not shown) extending from the main body 10 into the lid 12 through the hinge mechanism 13. Reference numeral 51 denotes an elastically deformable nameplate which adheres to the recess 30. As shown in FIG. 3, indication marks 52 and 53 for indicating positions of the operation units 45 and 46 are formed in respective portions of the nameplate 51 which correspond to the operation openings 31 and 32. In addition, transparent windows 54 to 57 are formed in respective portions of the nameplate 51 which correspond to the indicator openings 33 to 36. In FIG. 1, reference numeral 58 denotes a clamp for releasing a lid lock which is provided in the grip portion 17.

With a rice cooker having the above arrangement, since the operation panel 29 is upwardly arranged on the lid 12, no projection such as in a conventional operation panel projects from the outer peripheral portion of the main body 10. As a result, the rice cooker requires less space and has a good appearance. Furthermore, even if the main body 10 is positioned on a table or sink which is lower than the eye-level of the user, he or she can easily see the operation panel 29 above the main body 10 without stooping and standing at a position substantially in front of the panel. Therefore, visual recognition of the operation units 45 and 46, characters such as "cooking" or "warming" attached to the operation panel 29, and light from the light-emitting elements 47 to 50 can be improved as well as the operability of the operation units 45 and 46.

In order to obtain the above advantages, the operation panel can be formed integral with the outer lid plate. However, in such an arrangement, when repair of electronic parts on the printed circuit board 44 is required, the inner lid plate must be removed from the outer lid plate, which is difficult. Furthermore, when the operation panel projects from the outer lid plate as in the above embodiment, the base of the grip portion must be molded separately from the outer lid plate due to the construction of the mold. A separately formed operation panel may be fixed by screws on the outer lid plate. However, while this results in good removability, it also results in poor appearance since the head of the screw is exposed outside. If the operation panel is fixed by a screw from inside the outer lid plate, a neat appearance is maintained. However, the operation panel can be removed only when the inner lid plate is removed from the outer lid plate, thus resulting in inconvenience.

According to the above embodiment of the present invention, the operation panel 29 is fitted in the opening 41 of the outer lid plate 14 from outside the lid 12, and is fixed to the inner lid plate 15 by a screw 43 from outside the inner lid plate 15. For this reason, the head of the screw 43 is not exposed, thus resulting in a good appearance. Thus, the operation panel 29 can be easily removed from the lid 12 by removing the screw 43 and then lifting it outwardly from the opening 41. Furthermore, when the operation panel 29 is mounted, the engaging groove 37 of the operation panel 29 is engaged with the edge of the opening 41, and then, the ridge 38 is fitted in the opening 41 so that the peripheral portion of the operation panel 29 is brought into contact with the upper surface of the outer lid plate 14. In this state, if the screw 43 is inserted in the screw hole 42 of the inner lid plate 15 and is screwed in the boss 39 of the operation panel 29, the attachment of the operation panel 29 is completed. Thus, the operation panel 29 can be easily removed for repair. Since the operation panel 29 is fixed by the screw in such a manner, the clamping force is applied between the outer and inner lid plates 14 and 15 through the operation panel 29 so as to tightly fix them to each other. For this reason, assembly of the lid 12 including the operation panel 29 can be simplified.

Since the clamping force is applied at a portion near the center of the lid 12 by the operation panel 29, if an engaging force between the projections 18 of the outer lid plate 14 and the recesses 19 of the inner lid plate 15 is decreased by a modification of the outer and inner lid plates due to long term use, the outer and inner lid plates can be stably fixed to each other in comparison to a conventional arrangement. Furthermore, since the peripheral portion of the operation panel 29 is urged against the upper surface of the outer lid plate 14, the peripheral portion of the operation panel 29 can be stably brought into contact therewith without shifting, resulting in good appearance. Particularly, in the above embodiment, since the operation panel 29 is formed of an ABS resin, the nameplate 51 can be stably adhered. In addition to this, even if the boss 39 is integrally formed on the lower surface of the operation panel 29, the operation panel 29 will not deform unlike a conventional one made of, for example, polypropylene, thus keeping a good appearance of the operation panel.

Note that the present invention is not limited to the above embodiment, and various changes and modifications may be made within the spirit and scope of the present invention.

Figure 4:
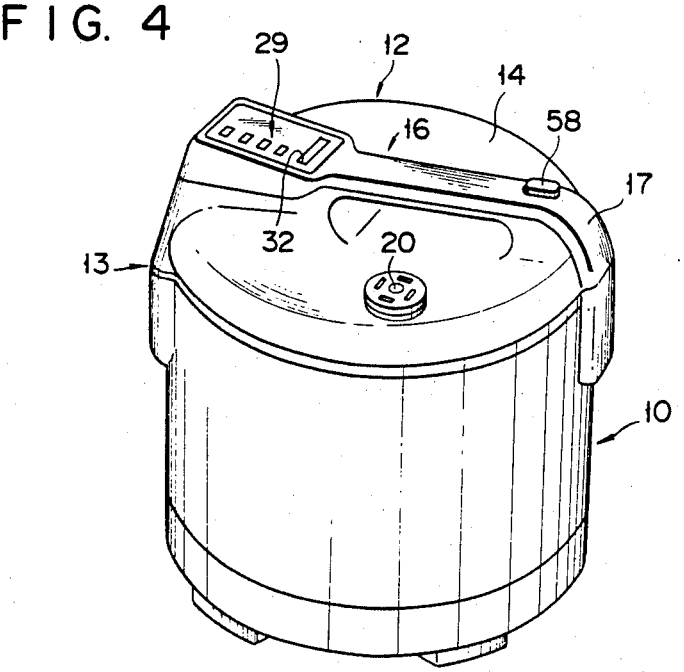
Figure 5:
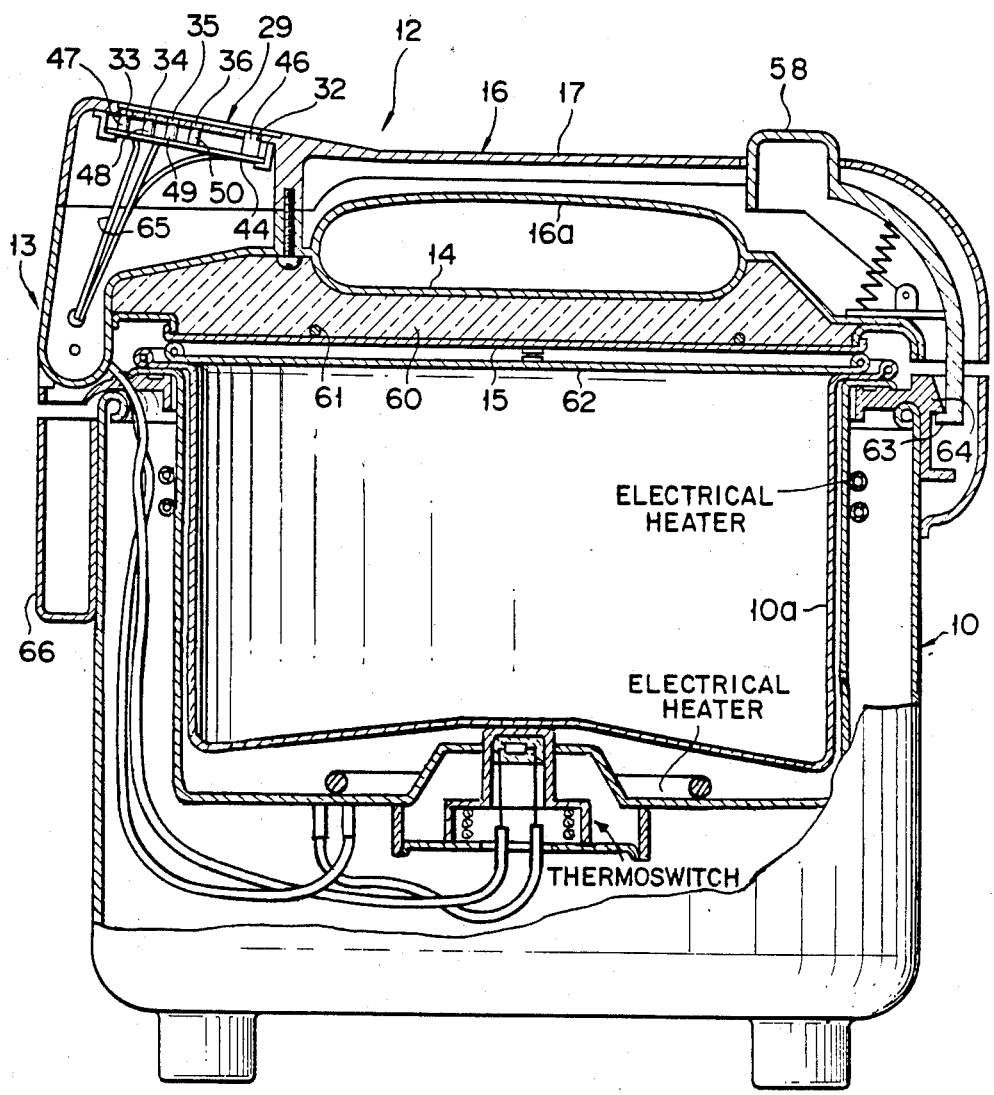

FIGS. 4 and 5 show a rice cooker according to the second embodiment of the present invention. In FIGS. 4 and 5, the same reference numerals as in the first embodiment denote the same parts in the second embodiment, and a detailed description thereof is omitted.

A lid 12 is pivotally mounted on a main body 10 having a pot 10a placed therein, and consists of outer and inner lid plates 14 and 15. A heat-insulating material 60 is provided between the outer and inner lid plates 14 and 15, and a lid heater 61 is mounted on the upper surface of the inner lid plate 15. An inner cover 62 is fixed to the lower surface of the inner lid plate 15 by an engaging means (not shown). A clamp 58 is provided in a grip portion 16 at an opposite position to a hinge 13. A engaging claw 63 formed at a distal end of the clamp 58 is engaged with an engaging portion 64 of the main body 10, thereby closing the lid 12 on the main body 10.

In this embodiment, an operation panel 29 is formed integrally with a cover 17 which is fixed to a base 16a of the grip portion 16 by, for example, a screw. The operation panel 29 is located at the hinge 13 side of the cover 17 to face upward. Particularly, in this embodiment, the operation panel 29 is inclined downward toward a position opposite to the hinge 13, that is, toward the clamp 58. In this operation panel 29, an operation opening 32 and indicator openings 33 to 36 are formed in the same manner as in the first embodiment. An operation unit 46 of an operation switch and light-emitting elements 47 to 50 are provided on a printed circuit board 44 arranged below the operation panel 29 and face the openings 32 to 36, respectively. Electronic parts such as the operation switch and the light-emitting elements are connected to lead wires 65 extending from the main body 10 into the lid 12 through the hinge 13. In FIG. 5, reference numeral 66 denotes a collector for collecting condensed water which is attached to the outer surface of the main body 10 and immediately below the hinge 13.

According to the rice cooker having such an arrangement, since the operation panel 29 faces upward on the grip portion 16 of the lid 12, the operability of the operation unit and the overall visual recognition of the operation panel can be improved in the same manner as in the first embodiment. Since the operation unit 46 is depressed from above, if the operation unit 46 is depressed strongly, the main body 10 cannot be shifted unlike the conventional arrangement in which the operation unit is depressed from the side of the main body. Meanwhile, since the operation panel 29 is provided on the grip portion 16 of the lid 12, rice paste, water and the like pouring from a space between the main body 10 and the lid 12 will not wet the operation panel 29. Therefore, the electronic parts in the operation panel 29 can be satisfactorily protected from spillage. Since the operation panel 29 and the printed circuit board 44 are provided on the grip portion 16 at the hinge 13 side, the center of gravity of the lid 12 is positioned near the side of the hinge 13 rather than the center thereof. As a result, although the operation panel 29 is provided on the lid 12, the lid will not be too heavy when it is opened. Meanwhile, when the lid 12 is fully opened, the center of gravity of the lid does not become too high. Therefore, the weight balance of the rice cooker when the lid 12 is opened can be improved. Furthermore, since the printed circuit board 44 is positioned near the hinge 13, a length of the lead wires 65 from the main body 10 can be minimized, thereby simplifying connection of the lead wires and resulting in low cost. Unlike the case when the operation panel is provided at the center of the grip portion 16, sufficient spaces for repairing the operation panel 29 and the printed circuit board 44 can be obtained and the grip portion is easy to operate.

Meanwhile, since connecting portions of the lead wires 65 are positioned at the side of the hinge 13 in the operation panel 29, if this unit were to become wet due to water introduced from a gap of the operation panel 29, a dangerous condition of poor insulation results.

However, this problem is prevented in this embodiment, since the operation panel 29 is inclined downward to the side of the clamp 58 from the side of the hinge 13, even if the operation panel 29 is wet with water, water flows toward the clamp 58 side and does not remain on the operation panel at the side of the hinge 13. For this reason, introduction of water from the side of the hinge 13 into the operation panel 29 can be satisfactorily prevented and the connecting portions of the lead wires 65 cannot be wet, thereby providing a safe rice cooker.

Figure 6:
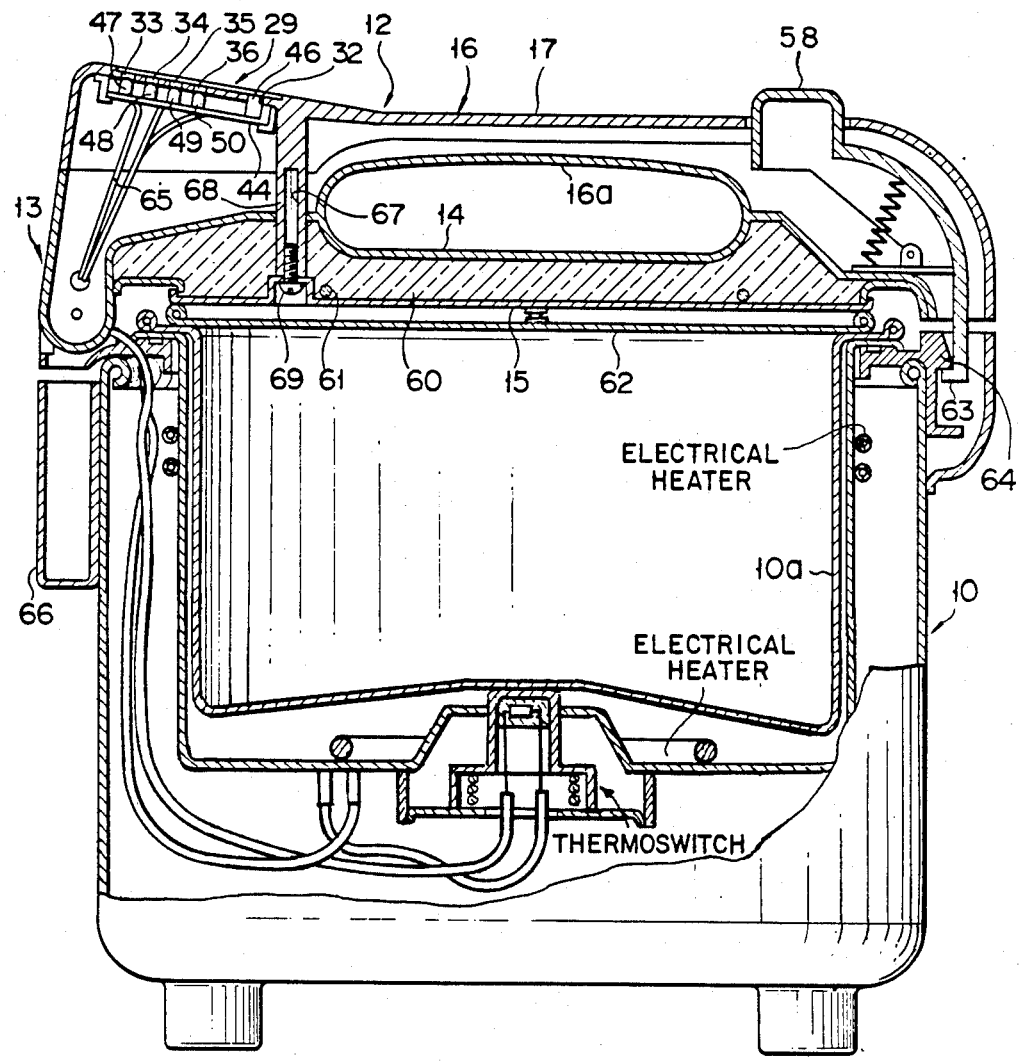
FIG. 6 is a cross-sectional view of a rice cooker according to a third embodiment of the present invention.

In the second embodiment, the operation panel 29 may be separately formed from the cover 17. In a third embodiment as shown in FIG. 6, the cover 17 may be provided with a boss 68 which extends downward and has a threaded portion 67. The boss 68 extends through the outer lid plate 14 and is urged against the inner surface of the inner lid plate 15. Furthermore, the boss 68 can be fixed by a screw 69 under the inner lid plate 15. According to this arrangement, in addition to effects of the second embodiment, the cover or the operation panel can be easily removed and repaired.

What is claimed is:

1. A structural arrangement for a rice cooker comprising:
a main body having an upper opening;
a pot, arranged for placement in the main body, for containing therein water and rice to be cooked;
a lid pivotally mounted on the main body and having an inner lid plate for opening and closing the upper opening and an outer lid plate which is externally provided on and covering the inner lid plate and is engaged therewith; and
means for operating the rice cooker, having an operation panel fixed on the lid to face upward and a printed circuit board disposed in the lid and connected to the operation panel, said operation panel being fitted to the outer lid plate from outside thereof and engaged with the inner lid plate, thereby holding the outer and inner lid plates in an engaged state.

2. A structural arrangement for a rice cooker according to claim 1, wherein said outer lid plate has an opening, and said operation panel has an engaging recess and an engaging projection which are engaged with edges of the opening and a boss extending from the operation panel toward the inner lid plate, said boss being fixed to a surface of the inner lid plate so as to be detachable from outside the lid, and said printed circuit board is attached to the operation panel to be opposite it.

3. A structural arrangement for a rice cooker according to claim 2, wherein said boss is fixed to the inner lid plate by a screw which is screwed from an outside of the inner lid plate.

4. A structural arrangement for a rice cooker according to claim 2, wherein said opening of the outer lid plate has a substantially rectangular shape, said operation panel is formed in a substantially rectangular shape, said engaging recess is formed in one side edge of the operation panel, and said engaging projection is formed along the remaining side edges of the operation panel.

5. A structural arrangement for a rice cooker according to claim 1,
wherein said printed circuit board is attached to the operation panel so as to be opposite to it;
wherein said operating means includes an operation switch mounted on the printed circuit board, and a plurality of light-emitting elements mounted on the printed circuit board, for indicating an operation process of the rice cooker; and
wherein said operation panel has openings which are formed to oppose the operation switch and light-emitting elements, respectively.

6. A structural arrangement for a rice cooker according to claim 1, which further comprises a hinge for pivotally supporting the lid on the main body, and wherein said lid includes a grip portion which extends across the lid from a position near the hinge to an opposite position thereto, said operation panel being provided on the grip portion at the position near the hinge.

7. A structural arrangement for a rice cooker according to claim 6, wherein said grip portion has a base which is formed integrally with the lid, and a cover which is detachably fixed to and covering the base, said operation panel being formed integrally with the cover.

8. A structural arrangement for a rice cooker according to claim 6, wherein said operation panel is inclined downward from a side of the hinge of the grip portion toward the opposite side thereto.

9. A structure arrangement for a rice cooker according to claim 8, wherein said operating means includes an operation switch and light-emitting elements, indicating an operation process of the rice cooker, which are respectively provided inside and opposing the operation panel, and a lead wire extending from the operation switch and light-emitting elements into the main body through the hinge.

10. A structural arrangement for a rice cooker according to claim 6, wherein said lid includes an inner lid plate for opening and closing the upper opening of the main body and an outer lid plate which is externally provided on and covering the inner lid plate and engaged therewith, said grip portion has a base which is formed integrally with the outer lid plate and a cover which is detachably provided to cover the base; and said operation panel is formed integrally with the cover and has a boss which extends through the outer lid plate toward the inner lid plate and is detachably fixed to the inner lid plate from an outside thereof.

* * * * *